United States Patent
Kagay, Jr.

(10) Patent No.: US 6,782,251 B2
(45) Date of Patent: Aug. 24, 2004

(54) METHOD AND APPARATUS FOR OPERATING A LOST MOBILE COMMUNICATION DEVICE

(75) Inventor: Howard Edward Kagay, Jr., Grayslake, IL (US)

(73) Assignee: Motorola Inc., Schaumburg, IL (US)

(*) Notice: Subject to any disclaimer, the term of this patent is extended or adjusted under 35 U.S.C. 154(b) by 28 days.

(21) Appl. No.: 10/255,340

(22) Filed: Sep. 26, 2002

(65) Prior Publication Data

US 2004/0063423 A1 Apr. 1, 2004

(51) Int. Cl.[7] .......................... H04M 3/16; H04M 3/00; H04L 9/00
(52) U.S. Cl. ................ 455/410; 455/411; 455/418; 713/168
(58) Field of Search ................ 455/410, 411, 455/418; 710/102; 713/168

(56) References Cited

U.S. PATENT DOCUMENTS

| | | | |
|---|---|---|---|
| 5,600,708 A | * | 2/1997 | Meche et al. ............... 455/411 |
| 5,724,662 A | | 3/1998 | Goldberg et al. |
| 5,734,928 A | | 3/1998 | Nakasuji |
| 5,734,978 A | * | 3/1998 | Hayatake et al. ............ 455/410 |
| 5,796,338 A | | 8/1998 | Mardirossian |
| 5,809,413 A | * | 9/1998 | Meche et al. ............... 455/411 |
| 5,845,213 A | | 12/1998 | Sumner et al. |
| 5,864,757 A | * | 1/1999 | Parker ......................... 455/418 |
| 5,887,250 A | * | 3/1999 | Shah ........................... 455/411 |
| 5,966,081 A | | 10/1999 | Chesnutt |
| 5,978,670 A | | 11/1999 | Casoli et al. |
| 5,987,509 A | | 11/1999 | Portuesi |
| 6,092,133 A | * | 7/2000 | Erola et al. .................. 710/301 |
| 6,314,283 B1 | * | 11/2001 | Fielden ........................ 455/411 |
| 6,393,270 B1 | * | 5/2002 | Austin et al. ................ 455/411 |
| 6,550,010 B1 | * | 4/2003 | Link et al. ................... 713/168 |

* cited by examiner

Primary Examiner—William Cumming
(74) Attorney, Agent, or Firm—Matthew C. Loppnow (57) ABSTRACT

An apparatus and method of operating a lost mobile communication device. A lost mobile communication device message can be received at the receiver of the mobile communication device. Operation of specified functions of the mobile communication device can be suspended based on information in the lost mobile communication device message. Lost mobile communication device status information can then be displayed on the display of the mobile communication device.

23 Claims, 5 Drawing Sheets

METHOD AND APPARATUS FOR OPERATING A LOST MOBILE COMMUNICATION DEVICE

BACKGROUND OF THE INVENTION

1. Field of Invention

The present invention is directed to a method and apparatus for operating a lost mobile communication device. In particular, the present invention is directed to a method and apparatus for security of a lost mobile communication device.

2. Description of Related Art

Presently, mobile communication devices such as portable phones, pagers, personal digital assistants, laptop computers, or the like are becoming smaller and more portable. Unfortunately, this portability and size reduction increases the probability of an owner losing the mobile communication device. For example, a portable phone may fall out of an owner's pocket or a notebook computer may be left on a plane. A person finding the mobile communication device may find it difficult to determine the owner and how to contact the owner. Also, the finder may also fraudulently use the mobile communication device. For example, the finder may make numerous long distance calls on a portable phone. The finder may also obtain confidential personal information about the owner in a calendar, datebook, or phonebook on the mobile communication device.

Thus, there is a need for suspending operation of specified functions of a mobile communication device if the mobile communication device is lost. There is also a need for assisting the finder of a lost mobile communication device in contacting the actual owner of the mobile communication device. These, and many other needs are satisfied by the present invention.

SUMMARY OF THE INVENTION

The invention provides an apparatus and method of operating a lost mobile communication device. A lost mobile communication device message is received at the receiver of the mobile communication device. Operation of specified functions of the mobile communication device are suspended. Lost mobile communication device status information is then displayed on the display of the mobile communication device. Also, an alert sequence can be enabled. The alert sequence can be disabled after a specified callback number is dialed. Furthermore, an operation at the input of the mobile communication device can be detected. A connection to the specified lost mobile communication device callback number can be attempted upon detection of the operation at the input of the mobile communication device. A found mobile communication device message can then be transmitted to the owner upon connection to the specified lost mobile communication device callback number. A ring tone can be provided at the mobile communication device upon connection to the specified lost mobile communication device callback number to instruct a finder to communicate with the owner of the lost mobile communication device.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
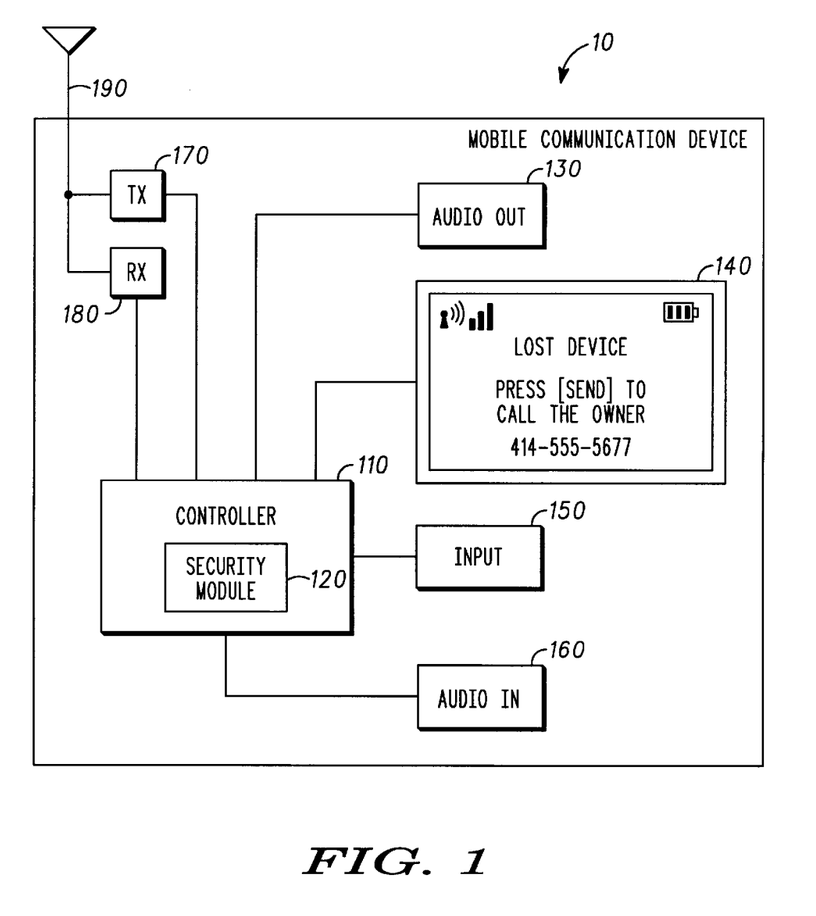
FIG. 1 is an exemplary block diagram of a mobile communication device according to a first embodiment.

FIG. 1 is an exemplary block diagram of a mobile communication device 10 according to a first embodiment. The mobile communication device 10 can include a controller 110 which can include a security module 120. The mobile communication device 10 can also include audio output circuitry 130, a display 140, an input 150, audio input circuitry 160, a transmitter 170, a receiver 180, and an antenna 190. The display 140 may be a liquid crystal display, a light emitting diode display, a plasma display, or any other display useful for outputting visual information. The input 150 may include a keypad, various buttons, a joystick, a rotary dial, a touchpad, or any other devices useful for inputting commands and data. All of the functions of the security module 120 may be performed by the controller 110 and all of the functions of the controller 110 may be performed by the security module 120.

In operation, the transmitter 170 can transmit signals and the receiver 180 can receive signals across a mobile communication network via the antenna 190. The audio output circuitry 130 can output audio signals such as speech or tones and the audio input circuitry 160 can receive audio signals. The input 150 can receive commands and data. The display 140 can display visual information. For example, the display 140 can display a signal strength, a battery charge, a telephone number, animated graphics, Internet information, or any other visual information.

The controller 110 and the security module 120 can control the operations of the mobile communication device 10. For example, the controller 110 can control the inputs and outputs of the mobile communication device. The controller 110 may also control incoming signals via the receiver 180 and outgoing signals via the transmitter 170.

The security module 120 can control security operations of the mobile communication device 10. For example, when a user realizes the mobile communication device 10 is lost, the user can remotely activate a suspend mode. The user may activate this suspend mode by sending the mobile communication device 10 a lost communication device message such as a short messaging service message, a page, a telephone call including lost device information, a telephone call including a DTMF signal, or any other communication useful for communicating that the mobile communication device 10 has been lost. The lost communication device message can include callback information such as a callback number indicating a number for reaching the owner at if the mobile communication device 10 is found. The lost communication device message can also include a code, such as a suspend mode activation command, for enabling a suspend mode. The security module 120 can then store suspend mode information and callback information for use if the mobile communication device 10 is found. In the suspend mode, the security module 120 can suspend operation of specific functions. For example, the security module 120 can lock out use of personal features such as a phonebook, a datebook, a web browser, and any other features that can or should be locked out if the mobile communication device 10 is lost.

The security module 120 can display lost mobile communication device status information on the display 140. This information can include a banner informing a finder of a lost mobile communication device that the device is lost. This information can also include a callback number for the finder to dial to contact the owner of a lost mobile communication device. This information can also include any other instructions useful for a finder of a lost mobile communication device. The security module 120 may suspend all outgoing calls except for the callback number, other designated numbers stored in the mobile communication device 10, and/or emergency numbers, such as 911. For example, the owner can designate numbers in the phonebook to be activated as callback numbers if the security module 120 enables a suspend mode.

The security module 120 may automatically dial the callback number regardless of the entry of a number that a finder wishes to dial. For example, the security module 120 may allow entry of alternate numbers, but will force a call to the callback number. The security module 120 may also automatically dial the callback number after any key is pressed or any input is triggered. Additionally, the security module 120 may disable the audio output circuitry 130 until the call is connected with the callback number. When the call is connected with the callback number, the security module 120 may then provide a ring alert tone via to audio output circuitry 130 to prompt the finder to communicate with the owner.

The security module 120 may also enable an alert sequence such as a sequence of loud beeps via the audio output 130 or a sequence of other audio, visual, or tactile signals to assist in locating the mobile communication device 10. For example, the security module 120 can initiate the alert sequence every ten seconds to assist in locating a lost mobile communication device if the owner is in a local area. The security module 120 can then eventually revert to the alert sequence every five minutes to conserve battery power. The alert sequence may stop when a key is pressed on the input 150. Alternately, the alert sequence may continue until the callback number is dialed, thus forcing a finder to call the callback number. Additionally, the alert sequence may continue until a security code is entered. For example, the security module 120 may temporarily stop the alert sequence when a call is placed to the callback number. The security module 120 may then revert to the alert sequence if a security code is not entered within a predetermined time after callback. Also, if a battery in the mobile communication device 10 is removed to stop the alert sequence, the security module 120 can restart the suspend mode and the alert sequence when the battery is replaced. The security code may be entered via the input 150, the audio input circuitry 160, via a call including a code to the receiver 180, or any other means useful for providing a code to the mobile communication device 10.

Figure 2:
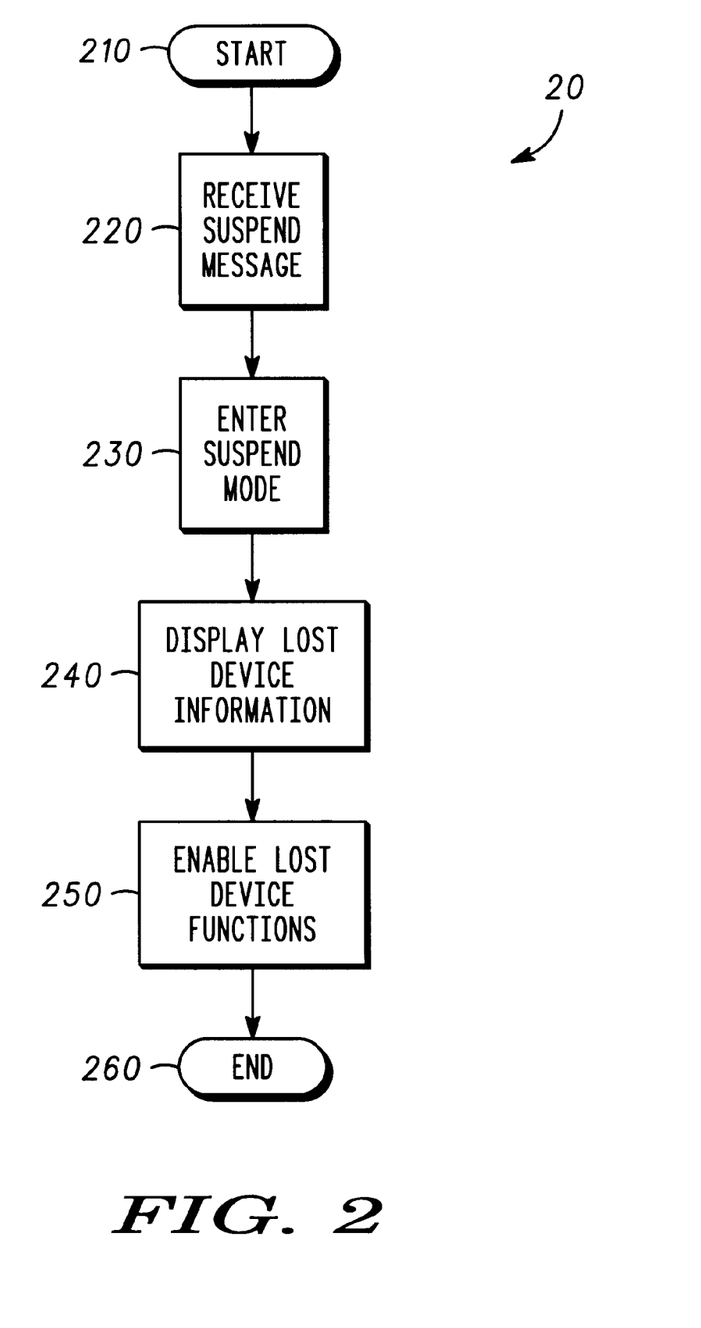
FIG. 2 is an exemplary flowchart outlining the operations of a security module of FIG. 1 according to a first embodiment.

FIG. 2 is an exemplary flowchart 20 outlining the operations of the security module 120 of FIG. 1 according to a first embodiment. In step 210, the flowchart begins. In step 220, the security module 120 can receive a suspend message such as a lost mobile communication device message that can include a callback number and a suspend code. In step 230, the security module 120 can enable a suspend mode. In the suspend mode, the security module 120 can disable operations of select mobile communication device functions including phonebook functions, select outgoing call functions, web browsing functions, or any other functions that should be suspended when a mobile communication device is lost. In step 240, the security module 120 can display lost mobile communication device status information on the display 140. For example, the security module 120 can display instructions for a finder of the mobile communication device 10, a callback number, or any other information useful for display on a lost mobile communication device. In step 250, the security module 120 can enable lost device functions. These functions can include automatically placing calls to a callback number, enabling audible alert sequences, or any other functions useful in a lost mobile communication device. In step 260, the flowchart 20 ends.

Figure 3:
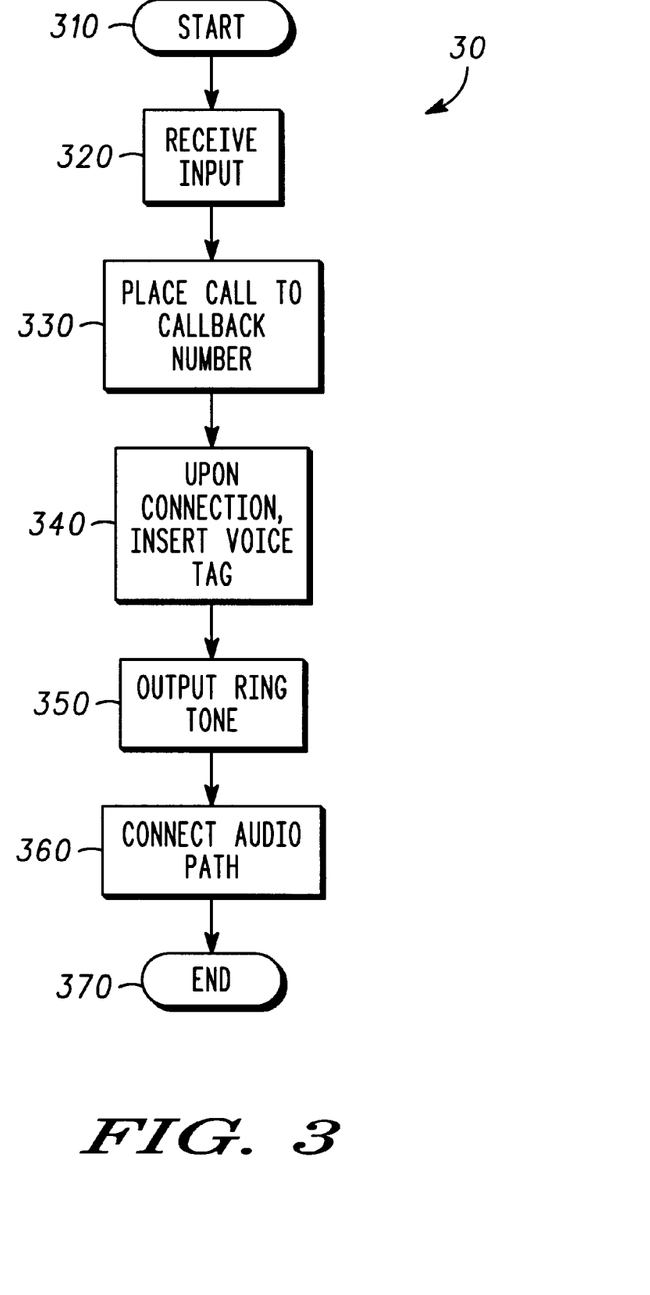
FIG. 3 is an exemplary flowchart outlining the operations of a security module of FIG. 1 according to a second embodiment.

FIG. 3 is an exemplary flowchart 30 outlining the operations of the security module 120 of FIG. 1 according to a second embodiment. This flowchart 30 illustrates one method of automatically placing calls to a callback number. In step 310, the flowchart begins. In step 320, the security module 120 receives an input. This input may be received via the input 150. For example, a finder of the mobile communication device 10 may provide input by attempting to place a call, by pressing a specific button such as a "send" button, by pressing any other button or key, or by any other means of providing input. In step 330, the security module 120 places a call to the callback number. For example, the security module 120 can ignore an attempt to place a call to a number other than the callback number and can force a connection attempt to the callback number. During this connection attempt, the security module 120 may disable an audio path including the audio input 160 and the audio output 130, or may play a message to a finder that a call attempt is being made to the owner of the mobile communication device 10. In step 340, if the call connects to the callback number, the security module 120 can insert a found mobile communication device message such as a voice tag. For example, the security module 120 can inform the owner that the call is from the lost mobile communication device 10. In step 350, the security module 120 can output a ring tone through the audio output circuitry 130. Thus, the finder will be prompted to pick up the mobile communication device 10 as if the finder is answering an incoming call. This ring tone may be a standard ring tone, a audible message that the owner is calling, or any other indication of a communication connection. In step 360, the security module 120 connects the audio path when the finder picks up the mobile communication device 10 to "answer" the connected communication. In step 370, the flowchart 30 ends.

Figure 4:
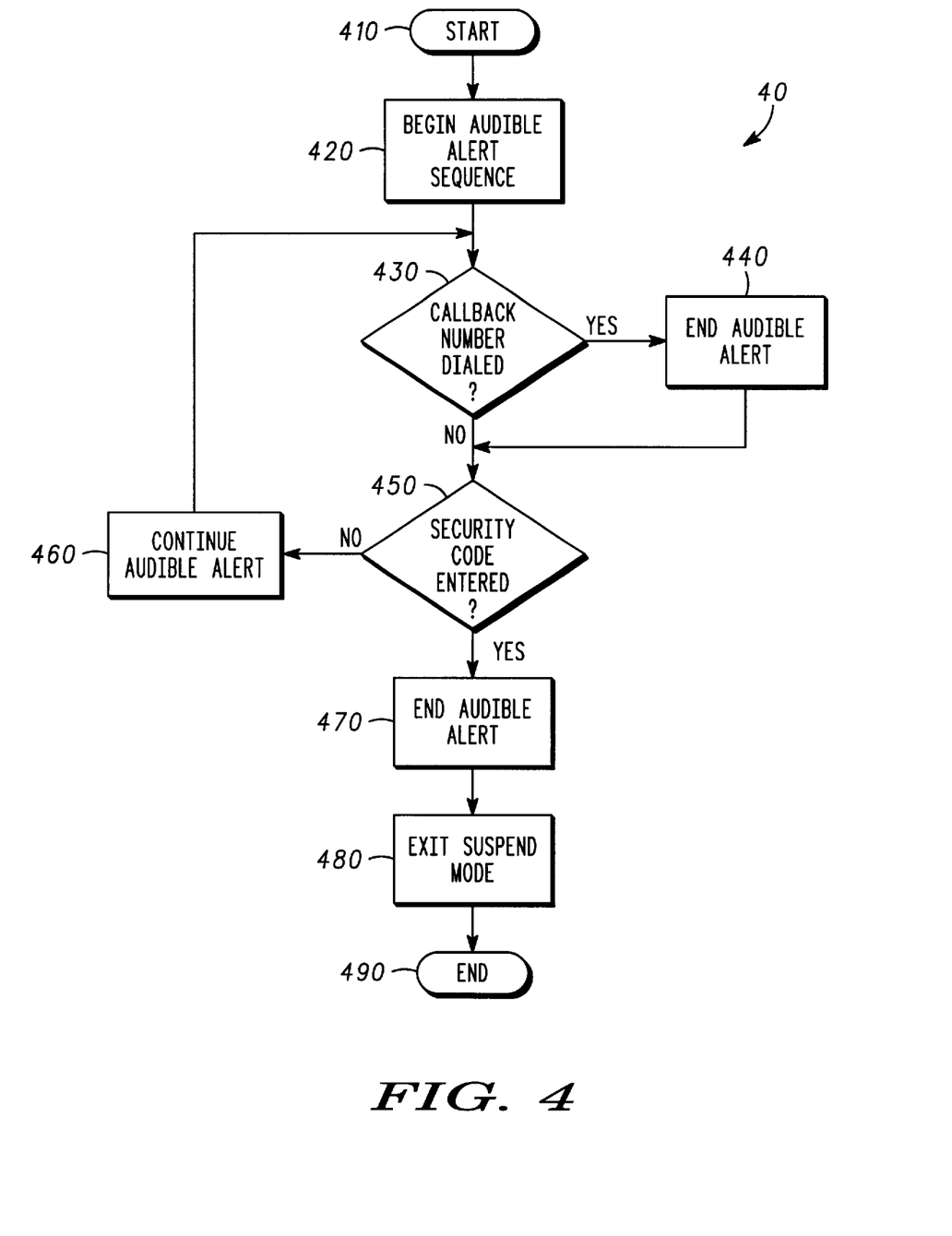
FIG. 4 is an exemplary flowchart outlining the operations of a security module of FIG. 1 according to a third embodiment.

FIG. 4 is an exemplary flowchart 40 outlining the operations of the security module 120 of FIG. 1 according to a third embodiment. The flowchart 40 illustrates an audible alert sequence that can be initiated in step 250 of flowchart 20. In step 410, the flowchart begins. In step 420, the security module 120 begins the audible alert sequence described above. In step 430, the security module 120 determines if the callback number is dialed. If so, the security module 120 suspends the audible alert sequence in step 440 and returns to step 450. If the callback number is not dialed, the security module 120 advances to step 450. In step 450, the security module 120 determines if a security code has been entered. The security code may be entered via the input 150, via a communication through the receiver 180, via fingerprint recognition via the input 150, or by any other means of entering a security code. If the security code has not been entered, the security module 120 continues the audible alert sequence in step 460. For example, if the callback number was dialed, but the security code has not been entered for a predetermined time, the security module 120 can resume the audible alert sequence. If the security code has been entered, the security module 120 ends the audible alert sequence in step 470. For example, if the callback number has not been dialed and the owner finds the mobile communication device 10, the owner can end the audible alert sequence. In step 480, the security module 120 exits suspend mode. In step 490, the flowchart 40 ends.

Figure 5:
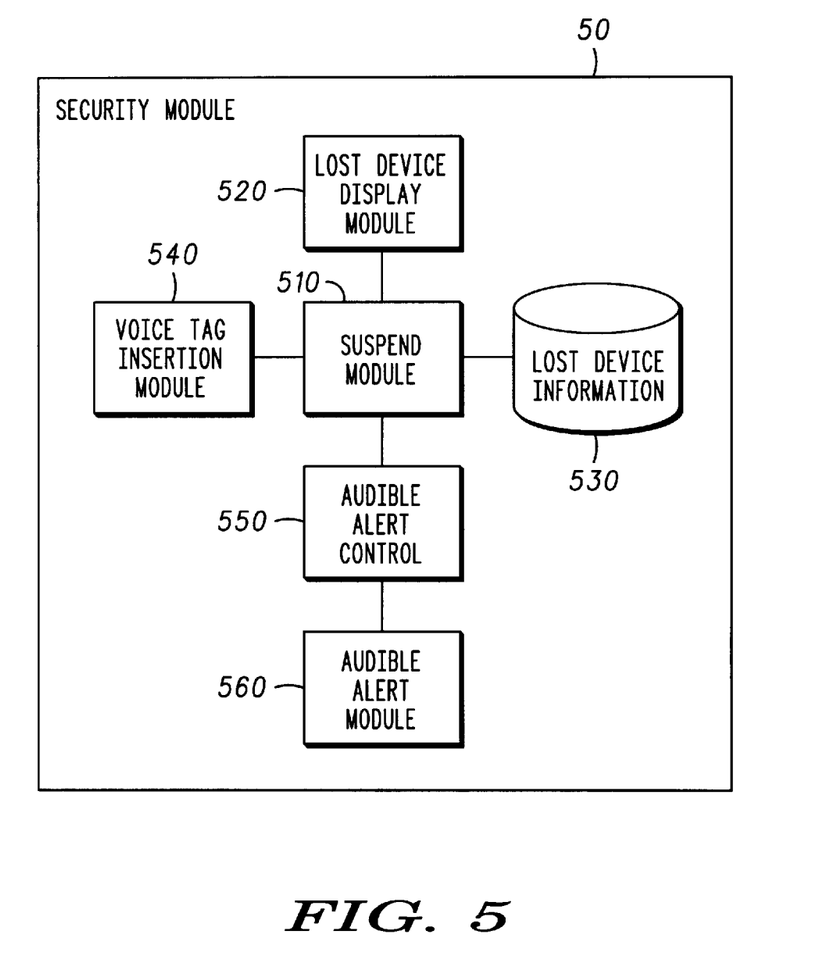
FIG. 5 is an exemplary block diagram of a security module of a mobile communication device according to a fourth embodiment.

FIG. 5 is an exemplary block diagram of a security module 50 of a mobile communication device according to a fourth embodiment. The security module 50 can employ hardware to perform the functions of the security module 120. The security module 50 may be utilized in the mobile communication device 10 or in any other portable device. The security module 50 can include a suspend module 510, a lost device display module 520, a lost device information database 530, a voice tag insertion module 540, audible alert control circuitry 550, and an audible alert module 560. In operation, the suspend module 510 detects the receipt of a lost mobile communication device message and initiates a suspend mode of the mobile communication device 10. The lost device information database 530 can store information used when the suspend mode is activated. For example, the lost device information database 530 can store a callback number, information regarding which features should be suspended and which features can be accessed in suspend mode, lost mobile communication status information to be displayed on the display 140, a voice tag, or any other useful information. Some or all of the information in the lost device information database 530 may be obtained from the lost mobile communication device message. The suspend module 510 can send a signal to the lost device display module 520 to instruct the lost device display module 520 to display lost mobile communication device status information on the display 140.

The suspend module 510 can also send a signal to the audible alert control circuitry 550. The audible alert control circuitry 550 can act as a switch to turn on the audible alert module 560, which generates an audible alert such as the alert sequence. The audible alert control circuitry 550 can also control the timing of the audible alert. For example, the audible alert module 560 can initiate the alert sequence every ten seconds to assist in locating a lost mobile communication device 10 if the owner is in a local area. The audible alert module 560 can then eventually revert to the alert sequence every five minutes to conserve battery power. The alert sequence may stop when a key is pressed on the input 150. Alternately, the alert sequence may continue until the callback number is dialed, thus forcing a finder to call the callback number. Additionally, the alert sequence may continue until a security code is entered.

The suspend module 510 can also control the callback functions of the mobile communication device 10 described above. For example, the suspend module 510 can make a connection attempt to the callback number when a key is pressed on the mobile communication device 10. Upon callback, the suspend module 510 can instruct the voice tag insertion module 540 to insert a voice tag informing the owner that a call is being received from the lost mobile communication device 10. The voice tag insertion module 540 may then connect an audio path to allow the owner to communicate with the finder of the lost mobile communication device 10.

The method of this invention is preferably implemented on a programmed processor. However, the controller 110, the security module 120, or the security module 50 may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted in the other embodiments. Accordingly, the preferred embodiments of the invention as set forth herein are intended to be illustrative, not limiting. Various changes may be made without departing from the spirit and scope of the invention.

What is claimed is:

1. A method of operating a mobile communication device including a display, an input, and a receiver comprising:

receiving a lost mobile communication device message at the receiver of the mobile communication device;

suspending operation of specified functions of the mobile communication device; and displaying lost mobile communication device status information on the display of the mobile communication device, wherein the lost mobile communication device message includes a suspend mode activation command, and a callback number.

2. The method of operating a mobile communication device according to claim 1, wherein the lost mobile communication device status information includes a lost mobile communication device message, and a callback number.

3. The method of operating a mobile communication device according to claim 1, wherein the step of suspending operation of specific functions comprises:

blocking access to personal information in the mobile communication device; and blocking access to wireless data services in the mobile communication device.

4. The method of operating a mobile communication device according to claim 1, further comprising:

enabling a alert sequence; and disabling alert sequence after a specified callback number is dialed.

5. The method of operating a mobile communication device according to claim 4, further comprising re-enabling the alert sequence upon power up if a security code is not entered.

6. The method of operating a mobile communication device according to claim 1, further comprising:

detecting a connection attempt to a number other than a specified lost mobile communication device callback number; and attempting a connection to the specified lost mobile communication device callback number upon detection of the connection attempt.

7. The method of operating a mobile communication device according to claim 1, further comprising:

detecting a operation at the input of the mobile communication device; and attempting a connection to a specified lost mobile communication device callback number upon detection of the operation at the input of the mobile communication device.

8. The method of operating a mobile communication device according to claim 1, further comprising:
attempting a connection to a specified lost mobile communication device callback number; and
transmitting a found mobile communication device message upon connection to the specified lost mobile communication device callback number.

9. The method of operating a mobile communication device according to claim 1, further comprising:
attempting a connection to a specified lost mobile communication device callback number; and
providing a ring tone at the mobile communication device upon connection to the specified lost mobile communication device callback number.

10. A mobile communication device comprising:
a display;
a receiver;
a transmitter;
an input;
an output; and
a security module coupled to the display, the receiver, the transmitter, the input, and the output, the security module being configured to receive a lost mobile communication device message from the receiver of the mobile communication device, suspend operation of specified functions of the mobile communication device, and display lost mobile communication device status information on the display of the mobile communication device,
wherein the security module is further configured to enable an alert sequence at the output, and disable the alert sequence after a specified callback number is dialed.

11. The method of operating a mobile communication device according to claim 10, wherein the security module is further configured to detect an operation at the input of the mobile communication device, and attempt a connection to a specified lost mobile communication device callback number upon detection of the operation at the input of the mobile communication device.

12. The method of operating a mobile communication device according to claim 10, wherein the security module is further configured to attempt a connection to a specified lost mobile communication device callback number and transmit a found mobile communication device message upon connection to the specified lost mobile communication device callback number.

13. The method of operating a mobile communication device according to claim 10, wherein the security module is further configured to attempt a connection to a specified lost mobile communication device callback number, and provide a ring tone at the output of the mobile communication device upon connection to the specified lost mobile communication device callback number.

14. A mobile communication device comprising:
a mobile communication device message receiver;
a mobile communication device suspend module coupled to the mobile communication device message receiver the mobile communication device suspend module configured to initiate a suspend mode of the mobile communication device;
a mobile communication device display module coupled to the mobile communication device suspend module;
a mobile communication device message display coupled to the mobile communication device display module;
an input coupled to the mobile communication device suspend module,
wherein the mobile communication device suspend module attempts a connection to a callback number upon detection of an operation at the input after the suspend module has initiated the suspend mode of the mobile communication device.

15. The mobile communication device according to claim 14, further comprising:
a mobile communication device audible alert module; and
an audible alert control module coupled to the a mobile communication device suspend module and selectively coupled to the mobile communication device audible alert module.

16. The mobile communication device according to claim 14, further comprising:
a mobile communication device information database coupled to the mobile communication device suspend module, the mobile communication device information database including
a mobile communication device status entry, and
a callback number entry.

17. The mobile communication device according to claim 14, further comprising:
a transmitter; and
a voice tag insertion module coupled to the mobile communication device suspend module and the transmitter.

18. A method of operating a mobile communication device including a display, an input, and a receiver comprising:
receiving a lost mobile communication device message at the receiver of the mobile communication device;
suspending operation of specified functions of the mobile communication device; and
displaying lost mobile communication device status information on the display of the mobile communication device,
wherein the lost mobile communication device status information includes
a lost mobile communication device message, and
a callback number.

19. A method of operating a mobile communication device including a display, an input, and a receiver comprising:
receiving a lost mobile communication device message at the receiver of the mobile communication device;
suspending operation of specified functions of the mobile communication device;
displaying lost mobile communication device status information on the display of the mobile communication device;
enabling an alert sequence; and
disabling alert sequence after a specified callback number is dialed.

20. The method of operating a mobile communication device according to claim 19, further comprising re-enabling the alert sequence upon power up if a security code is not entered.

21. A method of operating a mobile communication device including a display, an input, and a receiver comprising receiving a lost mobile communication device message at the receiver of the mobile communication device;

suspending operation of specified functions of the mobile communication device;

displaying lost mobile communication device status information on the display of the mobile communication device;

detecting an operation at the input of the mobile communication device; and attempting a connection to a specified lost mobile communication device callback number upon detection of the operation at the input of the mobile communication device.

22. The method of operating a mobile communication device according to claim 21, wherein detecting an operation further comprises detecting a connection attempt to a number other than a specified lost mobile communication device callback number; and wherein attempting a connection further comprises attempting a connection to the specified lost mobile communication device callback number upon detection of the connection attempt.

23. A method of operating a mobile communication device including a display, an input, and a receiver comprising:

receiving a lost mobile communication device message at the receiver of the mobile communication device;

suspending operation of specified functions of the mobile communication device;

displaying lost mobile communication device status information on the display of the mobile communication device;

attempting a connection to a specified lost mobile communication device callback number; and at least one of transmitting a found mobile communication device message upon connection to the specified lost mobile communication device callback number, and providing a ring tone at the mobile communication device upon connection to the specified lost mobile communication device callback number.

* * * * *